United States Patent [19]

Doble

[11] Patent Number: 4,907,736

[45] Date of Patent: Mar. 13, 1990

[54] METHOD OF FORMING ARTICLES

[75] Inventor: Gordon S. Doble, Shaker Heights, Ohio

[73] Assignee: Airfoil Textron Inc., Lima, Ohio

[21] Appl. No.: 198,709

[22] Filed: May 18, 1988

Related U.S. Application Data

[63] Continuation of Ser. No. 879,366, Jun. 27, 1986, abandoned.

[51] Int. Cl.$^4$ ............................................. B23K 31/00
[52] U.S. Cl. .................................. 228/190; 228/193; 228/243; 29/889.71
[58] Field of Search ................... 228/190, 193, 173.6, 228/243, 185, 186; 29/156.8 R, 419.1

[56] References Cited

U.S. PATENT DOCUMENTS

| Re. 31,355 | 8/1983 | Rozmus . | |
|---|---|---|---|
| 2,553,698 | 5/1951 | Brahs | 29/419 |
| 2,918,339 | 12/1959 | Hagadone | 29/419 X |
| 3,197,845 | 8/1965 | Intrater et al. | 228/193 X |
| 3,549,444 | 12/1970 | Katz | 29/419 |
| 3,668,748 | 6/1972 | Divecha et al. . | |
| 3,742,578 | 7/1973 | Dirne et al. | 228/190 X |
| 3,788,926 | 1/1974 | Weisinger . | |
| 3,821,841 | 7/1974 | Goodwin . | |
| 3,828,417 | 8/1974 | Divecha | 228/182 X |
| 4,012,824 | 3/1977 | Dawihl et al. | 29/419 R |
| 4,060,412 | 11/1977 | Divecha . | |
| 4,244,100 | 1/1981 | Terry | 29/419 R X |
| 4,292,725 | 10/1981 | Larsson et al. . | |
| 4,305,449 | 12/1981 | Loszewski et al. . | |
| 4,520,078 | 5/1985 | Rabinowitz et al. | 228/190 X |
| 4,529,452 | 7/1985 | Walker | 29/156.8 R X |
| 4,697,324 | 10/1986 | Grant et al. | 228/190 X |

*Primary Examiner*—Fred A. Silverberg
*Assistant Examiner*—Carmine Cuda
*Attorney, Agent, or Firm*—Edward J. Timmer

[57] ABSTRACT

An improved method of forming a filamentary reinforced article includes forming a preform of metal and filament layers by winding material around an axis. The resulting layered preform is enclosed in a fluid tight housing. The housing has a rigid frame which bounds the periphery of the preform. The housing also has flexible panel sections which extend inwardly from the frame across the preform. To bond the layers of the preform together and increase the density of the preform, the housing is subjected to a hot isostatic pressing operation. During the hot isostatic pressing operation, fluid pressure forces against the housing plastically deform the panel sections of the housing inwardly in a direction parallel to the axis around which the layers of the preform were wound to apply axial deformation forces to opposite sides of the preform. The deformation forces plastically deform the layers of the preform by decreasing the distance between minor side surfaces and increasing the distance between major side surfaces of the layers. This results in densification and bonding of the layers of the preform without subjecting the filaments of the preform to axial tension or compression stresses.

36 Claims, 3 Drawing Sheets

METHOD OF FORMING ARTICLES

This is a continuation of co-pending application Ser. No. 879,366, filed on June 27, 1986, now abandoned.

BACKGROUND OF THE INVENTION

The present invention relates to a method of forming a filamentary reinforced article.

A method of making a filamentary reinforced article is disclosed in U.S. Pat. No. 4,305,449. The article disclosed in this patent has a tubular configuration and has reinforcing filaments of boron, carbon, silicon carbide, or the like disposed in an aluminium or titanium matrix material. The reinforcing filaments extend axially along the tubular article. The tubular article is formed by expanding monolayers radially outwardly against a tubular mold.

A similar method of forming a tubular article is disclosed in U.S. Pat. No. 3,788,926. To make the article disclosed in this patent, four layers of boron/aluminum tape are wrapped to form a tube. Silicon carbide coated boron fibers are disposed in the layers and extend axially of the tube. The layered tube of boron/aluminum tape is enclosed in a tubular housing having a relatively heavy outer wall and a relatively thin inner wall. The housing is subjected to a hot isostatic pressing operation and the inner wall of the tube expanded outwardly to form a consolidated filamentary reinforced article.

The methods disclosed in these patents are not satisfactory to produce circular or noncircular rings and disks having thick filament reinforced walls where the axes of the filaments are oriented at a substantial angle to the central axis of the ring or disk. This is because, during a hot isostatic pressing operation, the reinforcing filaments tend to crack and/or buckle. The cracking and/or buckling occurs because the reinforcing filaments do not increase or decrease in length under the influence of tension or compression forces.

If a composite layered preform having reinforcing filaments oriented at a substantial angle to the axis of the preform is made with an open center, during a hot isostatic pressing operation, the fluid pressure against the inner layers will cause these layers to tend to increase in size and will subject the filaments to tension forces which may crack the filaments. During the hot isostatic pressing operation, the fluid pressure against the outer layers will cause these layers to tend to decrease in size and will subject the filaments to compression forces which may cause the filaments to buckle. The cracking and/or buckling of the filaments in a filamentary reinforced article is very detrimental to the operating characteristics of the article.

BRIEF SUMMARY OF THE INVENTION

The present invention provides a method of forming a filamentary reinforced article, such as a circular or noncircular ring or disk having thick walls, where the filament orientations are at a substantial angle to the central axis of the article. To form the article, a layered preform of metal and filament is formed by winding material around an axis. This may advantageously be done by placing lengths of composite on a carrier strip with the longitudinal axes of the lengths of composite extending parallel to the longitudinal axis of the carrier strip. The carrier strip and the lengths of composite are then wound about an axis to form a layered preform.

The preform is enclosed in a fluid tight housing having a rigid outer section which encloses the periphery of the preform and a rigid hub section. The housing may have one or more flexible panel sections which extend inwardly from the rigid frame and are disposed in engagement with the layers of the preform.

The layers of the preform are bonded together and densified by applying pressure against the housing. The pressure forces plastically deform the flexible panel sections of the housing inwardly in a direction generally parallel to the axis around which the layers of the preform were wound to apply axial deformation forces to opposite sides of the preform The axial deformation forces plastically deform the layers to decrease the distance between minor side surfaces of the layers. As this occurs, the layers of the preform are bonded together and the density of the preform is increased without subjecting the reinforcing filaments to either excessive tension or compression forces in a direction along the filaments.

Accordingly, it is an object of this invention to provide a new and improved method of forming an article and wherein filament containing layers of a preform are bonded together and the density of the preform is increased by plastically deforming layers of the preform under the influence of deformation force applied against minor side surfaces of the layers of the preform while maintaining the filaments free of excessive strain along the filaments.

Another object of this invention is provide an improved method of forming an article by placing lengths of composite having a metal matrix and reinforcing filaments on a carrier strip and winding the carrier strip and lengths of composite about an axis to make a preform.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

Article

Figure 1:
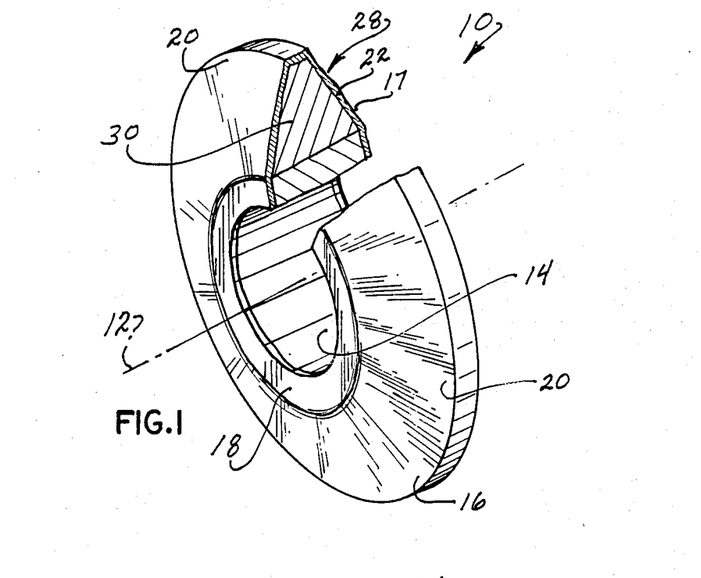
FIG. 1 is a partially broken away pictorial illustration of a filamentary reinforced article constructed by the method of the present invention.

A filamentary reinforced article 10 is illustrated in FIG. 1. The article 10 is representative of numerous different articles of circular and noncircular configurations which can be made by the method of the present invention. The articles made using the method of the present invention can be used in many different environments. However, it is contemplated that the article 10 will be used in aircraft and aerospace structures. For example, the article 10 could be a component which is rotated at high speeds during operation of a turbine engine.

The illustrated article 10 is a circular disk having a central axis 12 which extends through a circular central opening 14 in the disk. The disk has radially extending side surfaces 16 and 17 which taper axially inwardly from a relatively thick central portion 18 to a relatively thin peripheral portion 20. Although the disk 10 has a radially outwardly and axially inwardly tapering cross sectional configuration, the disk could have other cross sectional configurations if desired. For example, the disk could flare both radially and axially outwardly or could have a rectangular or oval cross sectional configuration.

The article 10 is a one-piece structure formed of reinforcing filaments and components which are diffusion bonded together. Thus, the article 10 has a metal outer casing 28 which surrounds a fully dense core 30. The core 30 has a metal matrix which is diffusion bonded to the casing 28. Collimated (aligned) reinforcing filaments are disposed in the core and extend in a direction transverse, in the illustrated embodiment of the invention perpendicular, to the central axis 12 of the article 10.

The reinforcing filaments in the core 30 can be of any one of many known constructions, such as monofilaments, rovings comprising monofilaments, staple fibers, and/or thread or yarn made from staple fibers, etc. The specific manner in which the filaments are made and the specific composition of the filaments does not, per se, form a part of the present invention. However, the filaments are relatively strong and reinforce the metal matrix of the core 30 to enable the article 10 to withstand very high centrifugal forces under severe operating conditions.

Although the article 10 has been shown in FIG. 1 as being a circular disk with an open center, the article 10 could be a solid circular disk, that is a disk which does not have an open center. In addition, the article 10 could have a configuration other than the illustrated circular configuration. For example, it is contemplated that the article 10 could be formed with an elliptical, rectangular or a nonsymmetrical configuration if desired. Of course, the specific configuration of the article 10 will depend upon the environment in which the article is to be used.

Forming the Article Preform

An article preform 44 (FIG. 2) having a configuration corresponding to the configuration of the core 30 is made by winding a carrier strip 36 and composite preform 38 around an axis 40. The resulting article preform 44 has a multilayered construction and a configuration which corresponds to the configuration of the core 30. The article preform 44 has an inside diameter which is the same as the inside diameter of the core 30 and an outside diameter which is the same as the outside diameter of the core.

Figure 2:
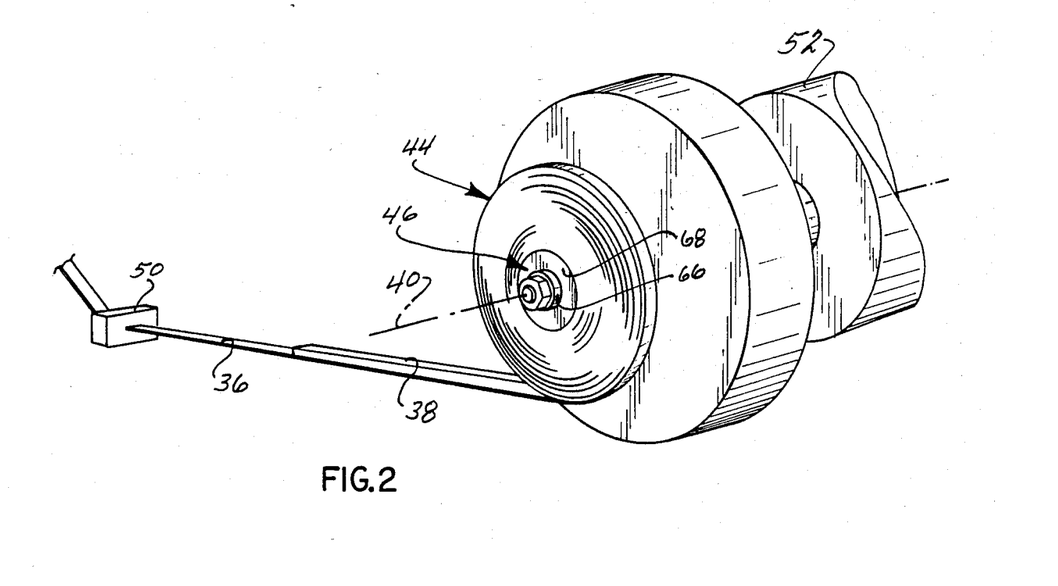
FIG. 2 is a schematic illustration depicting the manner in which lengths of composite are positioned on a carrier strip and wound around a hub to form a layered preform.

The carrier strip 36 is made of a metal foil. The carrier strip 36 is engaged by a suitable tensioner 50 to promote a tight wrapping of filament containing composite preforms 38 around the hub 46 as the hub is rotated about the axis 40 by a suitable drive assembly 52. The metal foil of the carrier strip 36 may have the same composition or a different composition than a metal matrix of the composite preform 38.

In order to obtain the desired volume fraction of reinforcement, the thickness of the metal matrix of a composite preform 38 can be reduced by an amount corresponding to the thickness of the carrier strip 36. The carrier strip 36 will usually have a thickness which is one-third or less of the thickness of the composite preform 38. Thus, a metal foil of the carrier strip 36 could have a thickness of approximately 0.002 inch, while the composite preform 38 could have a thickness of approximately 0.007 inch.

The composite preform 38 is of a known structure and includes reinforcing filaments disposed in a metal matrix. The reinforcing filaments can be disposed in many different orientations in the metal matrix. While the longitudinal axes of the reinforcing filaments are generally parallel to the longitudinal central axis of the composite preform 38, the longitudinal axes of the filaments could be at an angle, or alternatively angle plied in a plus and minus sequence to the longitudinal central axis of the composite preform 38. The reinforcing filaments are preferably diffusion bonded in the matrix to form a fully dense preform, such as a diffusion bonded monotape having collimated filaments. However, where the desired operating characteristics or geomentry of the article 10 permit, the composite preform 38 could be a semi-dense preform, such as a plasma or arc sprayed monotape, an infiltrated wire bundle, or a woven filament mat consisting of fibers held together by cross pieces of fine metal wire or ribbon.

In making the article preform 44, lengths of composite preform 38, for example, lengths of fully consolidated monotape 24 inches long, are placed on the carrier strip 36. While the composite preforms 38 have a length of approximately 24 inches, the preforms could have any desired length. Thus, the composite preforms could be very long so that only one or two of the preforms would be required to form a specific article. If longer lengths of monotape are used, the carrier strip may be eliminated.

The longitudinal central axes of the composite preforms 38 are aligned with the longitudinal central axis of the carrier strip 36. The longitudinal axes of the reinforcing filaments in the composite preform 38 are also aligned with the longitudinal axis of the carrier strip 36. The carrier strip 36 and lengths of composite preform 38 are then wound round the axis 40 to form a layered article preform 44.

To make the article preform 44, one end 56 (FIG. 3) of the carrier strip 36 is fixedly connected to the hub assembly 46. The lengths of composite preform 38 are placed on the carrier strip 36 with end surfaces of the composite preforms 38 abutting at joints 40. The hub assembly 46 is then rotated, in a counterclockwise direction as viewed in FIGS. 2 and 3, to wind the carrier strip 36 and successive lengths of composite preform 38 in layers around the hub in a spiral.

The annular core 30 (FIG. 1) of the illustrated article 10 tapers from a thick central portion 18 to a thin rim portion 20. In order to make the article preform 44 with a taper which corresponds to the taper of the core 30, it is necessary to have the width of the composite preforms 38 sequentially decrease in the manner illustrated schematically in FIG. 4. Thus, a first composite preform 38a wound around the hub assembly 46 is wider than the next succeeding composite preform 38b having a leading end disposed in abutting engagement with the trailing end of the composite preform 38a. Similarly, the composite preform 38c is narrower than the composite preform 38b and a next succeeding composite preform 38d is narrower than the composite preform 38c. By sequentially decreasing the width of each of the composite preforms 38 wound around the hub assembly 46, an article preform 44 having a desired rate of taper can be formed. Of course, if it was desired to form the core 30 with a different configuration, the widths of the composite preforms 38 would be varied in a different manner to obtain the desired cross sectional configuration of the core.

Figures 3, 4, 5, 5A, 6, 6A:
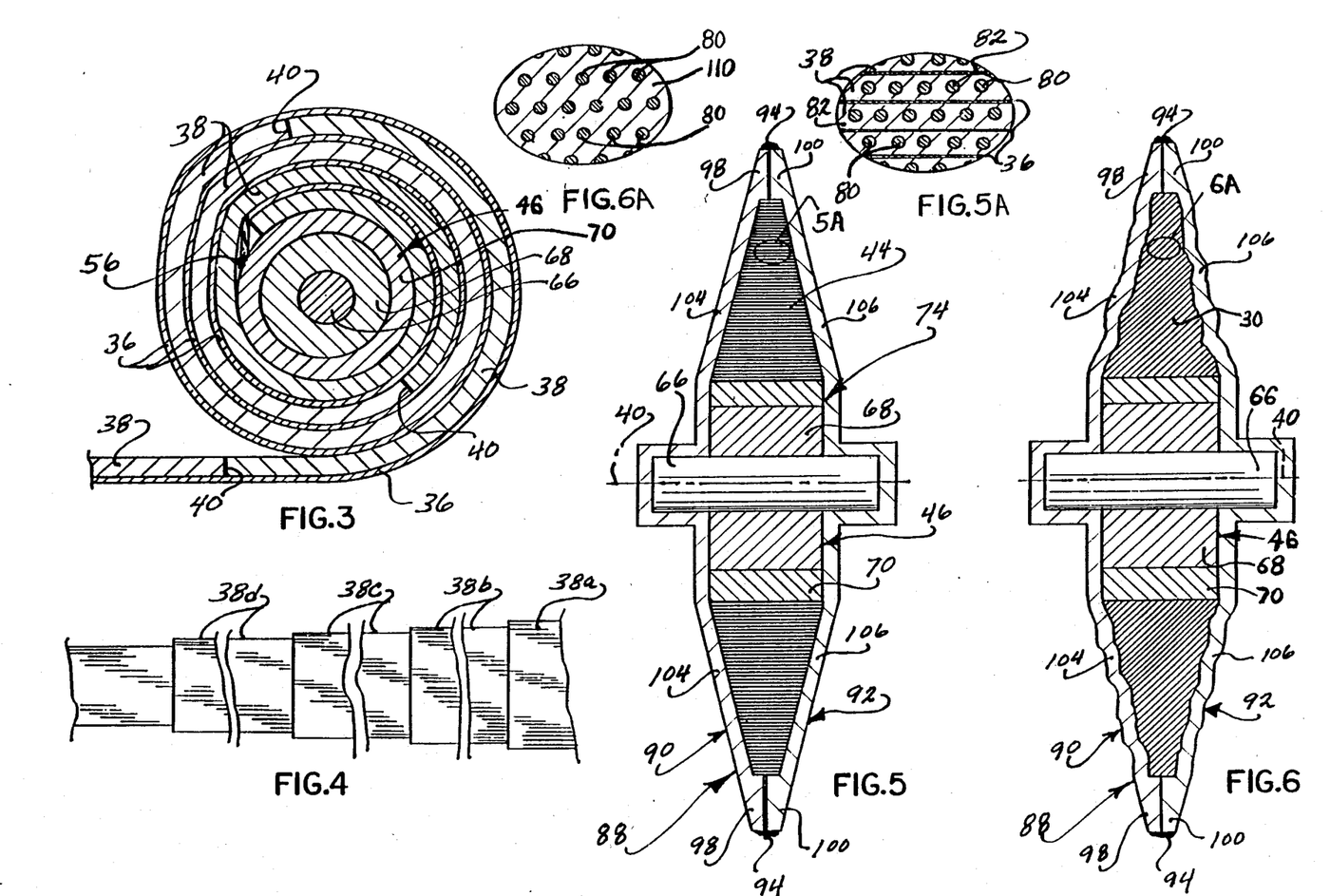
FIG. 3 is an enlarged schematic illustration depicting the manner in which the lengths of composite and the carrier strip are wound around the hub.
FIG. 4 is a highly schematicized illustration depicting the manner in which the width of adjacent lengths of composite decrease to result in a radially outward and axially inward tapered and layered preform upon winding of the composite about the hub.
FIG. 5 is a sectional view illustrating the manner in which a layered preform and hub are enclosed by a fluid tight housing.
FIG. 5A is an enlarged view of the encircled portion of FIG. 5.
FIG. 6 is a sectional view, generally similar to FIG. 5, illustrating the manner in which the housing is deformed during a hot isostatic pressing operation to bond the layers of the preform together and to increase the density of the preform.
FIG. 6A is an enlarged view of the encircled portion of FIG. 6.

The hub assembly 46 includes a cylindrical steel support shaft or pin 66 which is surrounded by a cylindrical steel support ring 68 (FIG. 5). The cylindrical sleeve 70, of the same material as the carrier strip 36, is disposed between the support ring 68 and the article preform.

Since the opening 14 in the article 10 is circular, the support ring 68 and sleeve 70 of the hub assembly 46 have circular outer side surfaces. However, if the opening 14 through the article 10 is to have a different configuration, for example, rectangular or oval, the outer side surface of the support ring 68 and the inner side surface of the sleeve 70 could be either rectangular or oval. This is because the inner side surface of the sleeve 70 is machined to form the inner side surface of the article 10.

Since the periphery of the article 10 is circular, the sleeve 70 has a cylindrical outer side surface. However, if the periphery of the article 10 is to have a different configuration, for example, rectangular or oval, the outer side surface of the sleeve 70 would be either rectangular or oval. Inserts could be provided between layers of the preform 44 to give the preform a nonsymmetrical configuration.

The hub assembly 46 and article preform 44 form a preform assembly 74. The various layers of the composite preform 38 and carrier strip 36 are disposed in a tight, but not fully dense, spiral coil around the hub assembly 46. The various layers of the article preform 44 (illustrated in the enlarged section of a portion of the article preform in FIG. 5A) are not interconnected at this time.

The reinforcing filaments 80 are disposed in a metal matrix 82. Each of the thin rod-like reinforcing filaments 80 has a central axis which is perpendicular to the central axis 40 of the hub assembly 46 and preform assembly 74. The reinforcing filaments 80 are disposed in the metal matrix 82 with the longitudinal central axes of the reinforcing filaments extending parallel to each other and with the filaments spaced apart from each other. Although the layers of the article preform 44 have not been bonded together and the article preform is not fully dense, the article preform does have a configuration which corresponds to the configuration of the core 30 of the article 10.

Bonding Layers and Increasing the Density of the Article Preform

The layered article preform 44 is not fully dense. This is due to a combination of many different factors, including: the joints at the ends of the composite preforms 38 are not exactly matching, the surfaces of the composite preform 38 and carrier strip 36 are not in precise engagement throughout their extent, and the winding of the carrier strip 36 and composite preforms 38 around the axis 40 did not eliminate all space between the layers of the article preform. Therefore, the article preform 44 must be compacted in order to obtain a fully dense core 30 for the article 10.

As the layers of carrier strip 36 and composite preforms 38 are wound around the axis, the layers are not radially interconnected. In order to maximize the strength of the article core 30 and the operating characteristics of the article 10, it is necessary to bond the layers of the article preform 44 together to form a unitary structure. However, during the compacting and bonding of the article preform 44, it is imperative that the reinforcing filaments 80 (FIG. 5) are not cracked under the influence of tension forces or buckled under the influence of compression forces acting in the filament direction, that is, in a direction parallel to a longitudinal central axis of a filament. Thus, the filaments 80 can be subjected to elastic forces along the filament of a magnitude large enough to cause only elastic deformation of the filaments. The filaments 80 are maintained free of forces along the filament of a magnitude sufficient to cause plastic deformation or fracture of the filaments.

In order to bond the layers of the article preform 44 together and to increase the density of the article preform, the entire preform assembly 74 (FIG. 5) is enclosed in a housing 88 and subjected to high temperatures and pressure. The high temperatures are obtained by heating the preform assembly 74 and housing 88 in a furnace. The high pressures are obtained by making the housing 88 fluid tight and exposing the housing to high fluid pressures. However, it is contemplated that the high pressures could be obtained by using a mechanical press or other methods.

The housing 88 is formed of two sections 90 and 92. The two housing sections 90 and 92 are positioned over opposite sides of the hub assembly 46 and article preform 44. The two housing sections 90 and 92 are interconnected with a fluid tight joint 94 which extends completely around the housing 88. In one specific instance, the housing 88 was evacuated and the joint 94 formed by electron beam welding the two housing sections 90 and 92 around the preform assembly 74.

In accordance with a feature of the present invention, the housing 88 is constructed so as to enable the article preform 44 to be compacted axially and to prevent any substantial change in the inside and outside diameters of the article preform during compaction. Thus, the housing section 90 has a thick annular outer section 98 which extends around and abuttingly engages the outer side surface of the article preform 44. Similarly, the housing section 92 has a thick annular outer section 100 which also extends around and abuttingly engages the outer side surface of the article preform 44. The two thick outer sections 98 and 100 of the housing sections 90 and 92 are interconnected at the joint 94 to form a rigid open center frame which encloses the article preform 44 and prevents both radially outward and radially inward changes in the outside diameter of the article preform 44 under the influence of fluid pressure forces. Similarly, the sleeve 70 engages the radially inner side surface of the article preform 44 and prevents either radially inward or outward changes in the inside diameter of the article preform under the influence of fluid pressure forces.

Although the housing 88 is constructed to cooperate with the sleeve 70 to prevent changes in the inside and outside diameters of the article preform 44 during a hot pressing operation, the housing 88 is constructed so as to enable the axial dimensions of the article preform 44 to be changed during a hot pressing operation. Thus, a thin circular panel section 104 of the housing section 90 extends radially inwardly from the thick outer section 98 past the ring 70 and over the hub assembly 46. Similarly, a thin circular panel section 106 extends inwardly from the thick outer section 100 of the housing section 92 past the ring 70 and over the hub assembly 46.

The panel sections 104 and 106 have inner side surfaces which abuttingly engage the edges or minor side surfaces of the carrier strip 36 and composite preforms 38 in the article preform 44 when the housing sections 90 and 92 are interconnected at the joint 94. Since the panel sections 104 and 106 are relatively thin, compared to the outer portions 98 and 100 of the housing sections 90 and 92 and the ring 70, the panel sections 104 and 106 of the housing can be plastically deformed axially inwardly by pressure forces during a hot pressing operation. Of course, the panel sections 104 and 106 could be deformed axially inwardly by forces other than fluid pressure forces. If desired, one of the panel sections 104 or 106 could be replaced by a rigid wall and the article preform 44 deformed by only plastic deformation of one panel section.

Once the preform assembly 74 has been fully enclosed in the fluid tight housing 88, the preform assembly and housing are subjected to a hot isostatic pressing operation. During the hot isostatic pressing operation, the article preform 44 is heated to a temperature sufficient to promote diffusion bonding of the carrier strip 36 with the composite preforms 38, to promote diffusion bonding of the composite preforms 38 with the sleeve 70, and to promote diffusion bonding of the housing sections 90 and 92 with the article preform 44 and sleeve 70. As a result of this diffusion bonding, the article preform 44, housing sections 90 and 92 and sleeve 70 form a one-piece unitary structure with reinforcing filaments 80 (FIG. 6A).

During the hot isostatic pressing operation, the heated housing 88 is subjected to relatively high fluid pressure to promote the formation of the diffusion bonds and to densify the article preform 44. The fluid pressure forces applied against the housing 88 are effective to plastically deform the panel sections 104 and 106 axially inwardly in the manner indicated schematically in FIG. 6. The thick outer sections 98 and 100 are relatively rigid and are not significantly deformed radially inwardly by the fluid pressure forces. Similarly, the fluid pressure forces cannot deform the sleeve 70 radially outwardly. Although the cylindrical inside surface of the sleeve 70 is firmly supported by the hub assembly 46, if the housing 88 was constructed so that the inside surface of the sleeve 70 was exposed to fluid pressure forces, the sleeve has sufficient rigidity to prevent radially outward plastic deflection of the sleeve under the influence of the fluid pressure forces.

The panel sections 104 and 106 are deformed axially inwardly toward each other to compact and fully densify the article preform 44. As the thin panel sections 104 and 106 are plastically deformed axially inwardly, the panel sections apply forces against the minor side surfaces of the composite preforms 38 and carrier strip 36. Although the axial forces might be expected to simply produce axial buckling of the composite preforms 38, the article preform 44 is wound tight enough and enclosed tight enough by the housing 88 and sleeve 70 to prevent axial buckling of the composite preforms 38. Therefore, composite preforms 38 merely become slightly thicker in a relatively uniform manner under the influence of the forces applied against the minor side surfaces to the layers 36 and 38 of the article preform 44 by the panel sections 104 and 106. Of course, the reinforcing filaments 80 tend to strengthen the composite preforms 38 against axial buckling.

The axial forces applied against the heated preform 44 by deformation of the housing panels 104 and 106 cause the composite strips 38 and the carrier strip 36 to diffusion bond together to form a solid metal matrix 110 (see the enlarged portion of FIG. 6A) in which the filaments 80 are disposed. Bonding of the layers 36 and 38 into a dense metal matrix is achieved by fluid pressure forces while the article preform 44 is held in a relatively high temperature. Bonding and densification takes place by means of plastic flow of the matrix metal producing solid state diffusion bonding. As this is occurring, the reinforcing filaments 80 do not undergo appreciable plastic flow. Thus, the direction of matrix plastic flow is in the axial direction, that is in a direction parallel to the axis 40, in order to prevent radial buckling or cracking of the reinforcing filaments 80.

As the bonding and densification of the article preform 44 is occurring, the metal of the panel sections 104 and 106 is being diffusion bonded to the metal matrix 110 under the influence of relatively high fluid pressure and temperature conditions. In addition, diffusion bonding is occurring between the sleeve 70 and the metal matrix 110. This results in the metal matrix 110 becoming a one-piece fully dense structure encased by the panel sections 104 and 106 and sleeve 70.

The fluid pressure forces 114 and 116 against the minor side surfaces 118 and 120 of the composite preform 38 cause the metal of the composite preform to be plastically deformed. Thus, the minor side surfaces 118 and 120 are moved inwardly toward the longitudinal central axis 138 of the composite preform 38, that is, from the position shown in solid lines in FIG. 7 to the position shown in dashed lines in FIG. 7. At the same time the major side surfaces 124 and 126 move outwardly away from the central axis 138, that is, from the position shown in solid lines in FIG. 7 to the position shown in dashed lines in FIG. 7.

Figure 7:
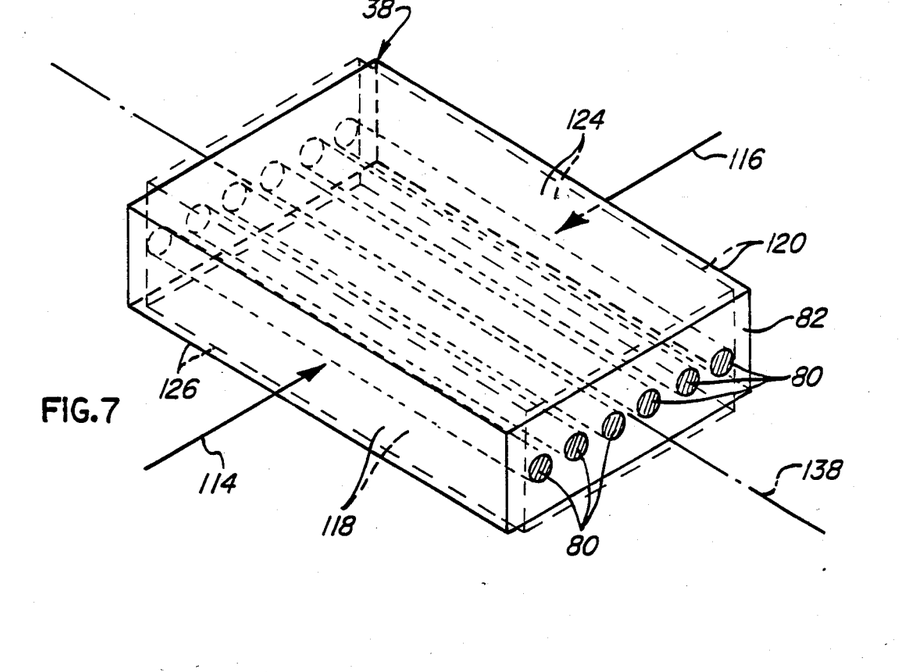
FIG. 7 is a schematic illustration depicting the forces applied to a segment of the composite and deformation of the composite during the hot isostatic pressing operation.

The volume of metal which is displaced inwardly by inward movement of the minor side surfaces 118 and 120 is equal to the volume of metal which is displaced outwardly by outward movement of the major side surfaces 124 and 126. The extent of outward movement of the major side surface 124 is limited by the rigid frame formed by the thick outer sections 98 and 100 of the housing sections 90 and 92. Similarly, inward movement of the major side surface 126 is limited by the rigid sleeve 70.

In accordance with a feature of the present invention, the filaments 80 are free of substantial forces in a direction parallel to the longitudinal axes of the filaments during the hot isostatic pressing operation. The axial fluid pressure forces applied against the article preform 44 by plastic deformation of the panel sections 104 and 106 merely tend to decrease the distance between the parallel reinforcing filaments 80. The filaments 80 are not stressed in axial tension or compression. Therefore, there is no tendency for the filaments 80 to break or to radially buckle.

After the hot isostatic pressing operation has been completed, the outer side surfaces of the housing 88 is shaped to form the casing 28 (FIG. 1) which surrounds the core 30. Thus, the portion of the housing 88 overlying the support shaft 66 (FIG. 6) is removed and the shaft engaged by a drive spindle of a machine tool. Portions of the side panels 104 and 106, the thick outer sections 98 and 100 of the housing 88 are then cut away to a configuration corresponding to the desired outer side surface configuration of the article 10. During this machining, only the metal of the housing 88 is shaped. The metal matrix 110 is not shaped so that there is no danger of cutting the reinforcing filaments 80. Since the housing 88 has become bonded to the metal matrix 110 during the hot isostatic pressing operation, after the machining operation is completed and the hub assembly 46 is removed, there is a one-piece unitary article 10 which is reinforced by the undamaged filaments 80.

The shaft 66 and ring 68 of the hub assembly 46 are formed of steel, while the sleeve 70 and the matrix 110 are of a different metal, for example, titanium. The steel shaft 66 and ring 68 have a greater coefficient of thermal expansion than the sleeve 70. However, the sleeve 70 ha substantially the same coefficient of thermal expansion as the matrix metal 110. Therefore, there is no tendency for the sleeve 70 to draw away from or delaminate the matrix metal 110 during cooling after the hot isostatic pressing operation. However, the ring 68 tends to contract to a greater extent than the sleeve 70 to facilitate removal of the hub assembly 46 from the sleeve. The inner side surface of the sleeve is machined to completely form the article 10.

One Specific Embodiment

The method of the present invention can be used to make articles having many different configurations and having many different types of reinforcing filaments 80 disposed in a matrices of many different types of metal 110. However, in one specific instance, an article having the configuration of the article 10 was formed with silicon carbide fiber reinforcing filaments 80 disposed in a titanium-6 aluminum-4 vanadium metal matrix. The article was enclosed by a casing 28 of the same metal as the matrix, that is titanium-6 aluminum-4 vanadium.

In order to make this specific article, consolidated monotapes of SCS6 silicon carbide fiber in a titanium-6 aluminum-4 vanadium was obtained with a nominal width of 1.5 inches, a thickness of 0.007 inch and a length of 24 inches long. In order to provide the tapered configuration of the article 10, the width of each length of consolidated monotape was made slightly less than the width of the a preceding monotape until the widths of the monotape had been reduced to the width of 0.25 of an inch. The monotapes contained collimated 5.6 mil diameter fibers spaced at approximately 118 fibers per inch. The carrier foil 36 was formed of titanium-6 aluminum-4 vanadium and had a thickness of 0.002 inch.

The hub assembly 46 included a mild steel pin having a diameter of approximately 0.50 inches. The support ring 68 had an outside diameter of approximately 1.75 inches. The sleeve 70 was formed of titanium-6 aluminum-4 vanadium and had an outside diameter of approximately 2.10 inches. The sleeve had an axial length of approximately 1.075 inches.

A total of 81 of the lengths 38 of consolidated monotape were wrapped about the sleeve 70 to make an article preform 44 having 173 layers. The resulting article preform 44 and hub assembly 46 were enclosed in titanium-6 aluminum-4 vanadium encapsulator or housing 88 having an outside diameter of 6.50 inches. The panel sections 104 and 106 each had a thickness of approximately 0.125 inches. The thick outer sections 98 and 100 of the housing had a radial extent of approximately 0.55 inches.

After the preform assembly 74 had been placed in the housing 88, the housing was evacuated and electron beam welded to form a fluid tight joint 94. The fluid tight housing 88 and preform assembly 74 were hot isostatically pressed at a temperature of approximately 1525° F. and a pressure of 15,000 pounds per square inch for approximately two hours.

After the hot isostatic pressing operation had been completed, a measurement of the housing 88 indicated that it had successfully prevented radial movement of the article preform 44 during the hot isostatic pressing operation. After the housing 88 had been machined to have the desired final configuration, it was placed in a matching cavity of a turbine engine and hot isostatically bonded into place. The article 10 was then spin tested until it burst at the predicted speed indicating that there was no cracking or buckling of the reinforcing filaments 80. Destructive analysis of the article after the test revealed no significant flaws in the manufacture of the article.

Another Embodiment

In the embodiment of the invention shown in FIGS. 5 and 6, the thick outer sections 98 and 100 of the housing 88 are integrally formed with the panel sections 104 and 106. In the embodiment of the invention illustrated in FIG. 8 and 8A, a separate rigid ring is provided around the outside of the article preform and enclosed by relatively thin panels. Since the embodiment of the invention illustrated in FIG. 8 is generally similar to the embodiment of the invention shown in FIG. 5, similar numerals will be utilized to designate similar components, the suffix letter "a" being associated with the embodiment of FIG. 8 to avoid confusion.

Figures 8, 8A:
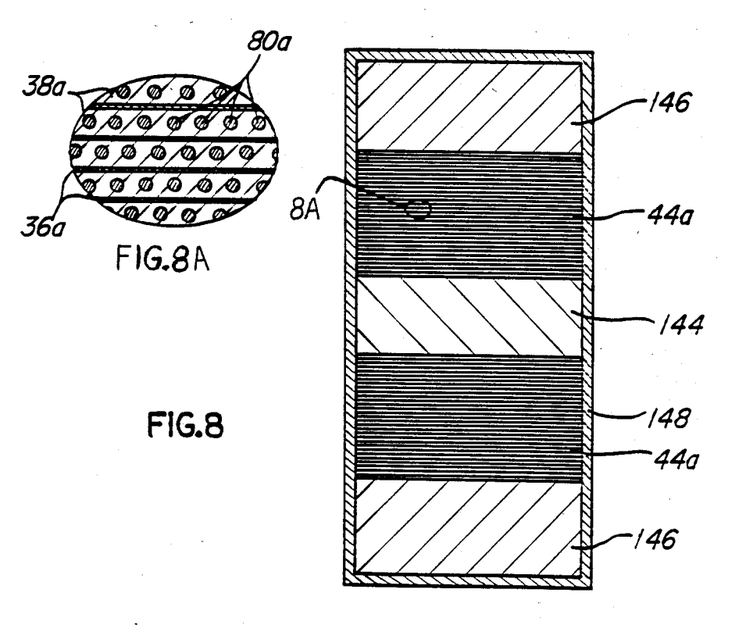
FIG. 8 is a schematic illustration of a second embodiment of the fluid tight housing which encloses the layered preform and hub.
FIG. 8A is an enlarged view of the encircled portion of FIG. 8.

In the embodiment of the invention shown in FIG. 8, an article preform 44a is disposed over a one-piece core or hub element 144 formed of titanium-6 aluminum-4 vanadium. A rigid annular ring 146 of a nickel-base superalloy is positioned over the outside of the article preform 44a. The thin wall encapsulator or housing 148 encloses the rigid outer ring 146, article preform 44a and rigid hub or core 144.

During a hot isostatic pressing operation, the relatively thin encapsulator or housing 148 deforms axially inwardly to cause densification and bonding of the layers 36a and 38a of the article preform 44a. The rigid outer ring 146 and core 144 prevent radial expansion or contraction of the article preform 44a so that the reinforcing filaments 80a are not subjected to axial tension or compression forces which will tend to crack or buckle the filaments 80a.

Conclusion

In view of the foregoing description, it is apparent that the present invention provides a method of forming a filamentary reinforced article 10, such as a circular or noncircular ring or disk having thick walls, where the filament orientations are at a substantial angle to the central axis 12 of the article. To form the article 10, a preform 44 of metal and filament is formed by winding material around an axis 40. This may advantageously be done by placing lengths of composite 38 on a carrier strip 36 with the longitudinal axes of the lengths of composite extending parallel to the longitudinal axis of the carrier strip. The carrier strip 36 and the lengths of composite 38 are then wound about the axis 40 to form a layered preform 44.

The preform 44 is enclosed in a fluid tight housing 88 having a rigid outer section 98 and 100 which encloses the periphery of the preform 44. The housing 88 has flexible panel sections 104 and 106 which extend inwardly from the rigid frame 98 and 100 and are disposed in engagement with the layers 36 and 38 of the preform 44.

The layers 36 and 38 of the preform 44 are bonded together and densified by applying pressure against the housing 88. The pressure forces plastically deform the flexible panel sections 104 and 106 of the housing 88 inwardly in a direction generally parallel to the axis 40 around which the layers of the preform 44 were wound to apply axial deformation forces 114 and 116 to opposite sides of the preform. The axial deformation forces 114 and 116 plastically deform the layers 36 and 38 of the preform 44 to decrease the distance between the minor side surfaces 118 and 120 of the layers. As this occurs, the layers 36 and 38 of the preform 44 are bonded together and the density of the preform is increased without subjecting the reinforcing filaments 80 to either excessive tension or compression forces in a direction along the filaments.

Having described specific preferred embodiments of the invention, the following is claimed:

1. A method of forming an article comprising the steps of forming a preform of layers containing metal and filaments, said layers including major side surfaces and minor side surfaces extending transversely to the major side surfaces with longitudinal axes of the filaments extending generally parallel to the major side surfaces of the layers, and metallurgically bonding the layers and increasing the density of the preform, said step of metallurgically bonding the layers and increasing the density of the preform including applying a deformation force against the preform in a direction generally perpendicular to minor side surfaces of the layers and parallel to major side surfaces of the layers, plastically deforming the layers under the influence of the deformation force by decreasing the distance between the minor side surfaces of the layers and increasing the distance between the major side surfaces of the layers including preventing substantial buckling of the preform from application of the deformation force, and maintaining the filaments substantially free of axially extending forces during performance of the step of bonding the layers and increasing the density of the preform.

2. A method as set forth in claim 1 further including the step of providing a rigid body against a major side surface of one of the layers of the preform prior to performing said step of bonding the layers and increasing the density of the preform, said step of bonding the layers and increasing the density of the preform including pressing the major side surface of the one layer against the rigid body under the influence of the force applied against the preform in a direction generally perpendicular to minor side surfaces of the layers.

3. A method as set forth in claim 1 further including the steps of covering minor side surfaces of the layers of the preform with a metal outer layer having a major side surface extending across the minor side surfaces of the layers of the preform, and bonding the metal outer layer to the preform during performance of said step of bonding the layers and increasing the density of the preform.

4. A method as set forth in claim 3 wherein said step of applying force against the preform includes the step of applying fluid pressure against the metal outer layer.

5. A method as set forth in claim 1 wherein said step of forming a preform includes providing a metal carrier strip, placing a plurality of lengths of a filamentary reinforced composite on the carrier strip with the ends of the lengths of composite in abutting engagement, and winding the carrier strip and lengths of composite around an axis to form the preform.

6. A method as set forth in claim 5 wherein said step of bonding the layers and increasing the density of the preform includes bonding the carrier strip to the lengths of composite.

7. A method as set forth in claim 1 wherein said step of forming a preform includes forming a preform having a generally circular configuration.

8. A method as set forth in claim 7 wherein said step of applying force against the preform in a direction generally perpendicular to minor side surfaces of the layers includes applying axially directed force against the circular preform.

9. A method as set forth in claim 7 further including enclosing an axially extending surface area of the circular preform with a rigid body, said step of applying force against the preform in a direction generally perpendicular to minor side surfaces of the layers includes applying axially directed forces against the circular preform, said step of bonding the layers and increasing the density of the preform includes limiting radial dimensional changes in the layers of the circular preform with the rigid body.

10. A method as set forth in claim 1 further including enclosing the preform in a fluid tight housing having a thick section adjacent a major side surface of one of the layers and a thin wall section adjacent minor side surfaces of the layers, said step of applying force against the preform includes applying fluid pressure against the thin wall section of the housing, deforming the thin wall section of the housing inwardly under the influence of the fluid pressure, and compressing the layers of the preform under the influence of force applied against the minor side surfaces of the layers of the preform by the thin wall section of the housing as the thin wall section of the housing is deformed inwardly.

11. A method as set forth in claim 10 further including the step of bonding the housing to the material of the preform during performance of said step of bonding the layers and increasing the density of preform, said method further including shaping the outside of the housing to form an outer side surface of the article after having performed said step of bonding the housing to the material of the preform.

12. A method as set forth in claim 1 wherein said step of applying force against the preform in a direction generally perpendicular to minor side surfaces of the layers includes applying force against the preform in a direction generally perpendicular to the longitudinal axes of the filaments.

13. A method as set forth in claim 1 wherein said step of applying force against the preform in a direction generally perpendicular to minor side surfaces of the layers includes simultaneously applying force against opposite minor side surfaces of the layers.

14. A method as set forth in claim 1 wherein said steps of decreasing the distance between the minor side surfaces of the layers and increasing the distance between the major side surfaces of the layers includes decreasing the distance between the minor side surfaces by an amount which is greater than the amount by which the distance between the major side surfaces is increased.

15. A method as set forth in claim 1 wherein said step of bonding the layers and increasing the density of the preform includes limiting the extent of the increase in the distance between the major side surfaces of the layers by blocking expansion of the layers in a direction perpendicular to major side surfaces of the layers with a rigid body.

16. A method of forming an article comprising the steps of providing a metal carrier strip, providing a plurality of elongated lengths of composite having a metal matrix and reinforcing filaments disposed in the metal matrix, placing the lengths of composite on the carrier strip with longitudinal axes of the lengths of composite extending parallel to the longitudinal axis of the carrier strip and with ends of lengths of composite in abutting engagement, winding the carrier strip and the lengths of composite about an axis on a rigid metal member to make a preform having a plurality of layers of composite and carrier strip wound on the member, and bonding the layers together and to the member and increasing the density of the preform by heating the preform and applying force against the layers with said member exhibiting substantial non-deformability during bonding and densifying.

17. A method as set forth in claim 16 wherein the step of applying force against the layers includes applying axial force against the layers in a direction generally parallel to the axis of the member around which the carrier strip and lengths of composite were wound.

18. A method as set forth in claim 17 further including enclosing the periphery of the preform with a rigid body having an axis which is coincident with the axis of the member around which the carrier strip and lengths of composite were wound, said step of bonding the layers and increasing the density of the preform including pressing a peripheral layer of the preform against the rigid body under the influence of the axial force applied against the layers to thereby limit deformation of the preform.

19. A method as set forth in claim 18 further including the step of providing a pair of flexible walls extending from the rigid body to the member across opposite sides of the preform, said step of applying axial force against the preform includes applying fluid pressure against the flexible walls and deforming the flexible walls inwardly under the influence of the fluid pressure.

20. A method as set forth in claim 16 wherein said step of providing a plurality of lengths of composite includes providing lengths of composite having different widths, said step of winding the carrier strip and lengths of composite about an axis to make a preform includes making a preform having an axial extent which varies as a function of variations in the width of the composite.

21. A method as set forth in claim 16 further including enclosing the preform in a fluid tight container, said step of applying force against the preform includes applying fluid pressure against the outer side surface of the container.

22. A method of forming an article comprising the steps of forming a preform of metal and filaments by winding material in layers around an axis, enclosing the preform in a fluid tight housing, said step of enclosing the preform in a fluid tight housing including enclosing the periphery of the preform with a rigid frame having an opening with an axis coincident with the axis of the preform around which the material was wound and enclosing opposite sides of the preform with flexible panel sections which extend inwardly from the frame toward the preform axis around which the material was wound, and bonding the layers and increasing the density of the preform, said step of bonding the layers and increasing the density of the preform including applying fluid pressure against the housing, deforming the panel sections of the housing inwardly under the influence of fluid pressure and in directions generally parallel to the preform axis around which the material was wound to apply axial forces to opposite sides of the preform in directions generally parallel to the axis around which the preform material was wound, and maintaining the dimensions of the frame substantially constant during the application of fluid pressure against the housing.

23. A method as set forth in claim 22 wherein said step of winding material around an axis includes providing a metal carrier strip, providing a plurality of enlongated lengths of composite having a metal matrix and reinforcing filaments disposed in the metal matrix, placing the lengths of composite on the carrier strip with longitudinal axes of the lengths of composite extending parallel to the longitudinal axis of the carrier strip and with ends of lengths of composite in abutting engagement, and winding the carrier strip and the lengths of composite about the axis to thereby make a preform having a plurality of layers of composite and carrier strip.

24. A method as set forth in claim 23 wherein said step of providing a plurality of lengths of composite includes providing lengths of composite having different widths, said step of winding the carrier strip and lengths of composite about an axis to make a preform includes making a preforming having an axial extent which varies as a function of variations in the width of the composite.

25. A method as set forth in claim 22 wherein said step of forming a preform includes forming a preform having a periphery with a circular configuration, said step of enclosing the periphery of the preform with a rigid frame includes enclosing the periphery of the preform with a rigid frame having a circular opening in which the preform is received.

26. A method as set forth in claim 22 wherein said step of enclosing the preform in a fluid tight housing includes providing a pair of housing sections each of which includes a panel section bounded by a relatively thick outer portion, said steps of enclosing the periphery of the preform with a rigid frame and opposite sides of the preform with panel sections including enclosing opposite sides of the preform with the housing sections with the relatively thick outer portions of the housing sections adjacent to each other and extending around the periphery of the preform and interconnecting the housing sections with a fluid tight joint which extends around the periphery of the preform and interconnects the relatively thick outer portions of the housing sections.

27. A method as set forth in claim 22 further including the step of providing a hub, said step of winding material around an axis includes winding material around the hub, said step of enclosing the preform in a fluid tight housing includes enclosing the hub in the fluid tight housing with the preform.

28. A method as set forth in claim 22 further including the step of providing a hub having a support section formed of a first metal having a first coefficient of thermal expansion and a sleeve formed of a second metal having a second coefficient of thermal expansion which is at least substantially the same as the coefficient of thermal expansion of the metal of the preform, said step of winding material around the axis includes winding material around the sleeve, said step of enclosing the preform in a fluid tight housing includes enclosing the hub in the fluid tight housing with the preform, said step of bonding the layers and increasing the density of the preform including heating the fluid tight housing, preform and hub, said step of heating the hub including thermally expanding the support section of the hub to greater extent than the sleeve and preform, said method further including cooling the fluid tight housing, preform and hub, said step of cooling the hub including thermally contracting the support section of the hub to a greater extent than the sleeve and preform.

29. A method as set forth in claim 22 wherein the filaments are wound around the axis with longitudinal axes of the filaments extending transversely to the axis around which the filaments are wound, said step of deforming the panel sections of the housing to apply axial forces to opposite sides of the preform includes maintaining the filaments substantially free of forces extending axially of the filaments.

30. A method as set forth in claim 22 wherein said step of deforming the panel sections of the housing inwardly to apply axial forces to opposite sides of the preform includes applying forces against the preform in directions generally perpendicular to longitudinal axes of the filaments.

31. A method as set forth in claim 22 further including the step of bonding the panel sections of the housing to the material of the preform during performance of said step of bonding the layers and increasing the density of the preform, said method further including shaping the outside of the housing to form an outer side surface of the article after having preformed said step of bonding the panel sections to the material of the preform.

32. A method of forming an article comprising the steps of forming a preform of layers containing metal and filaments, said layers including major side surfaces and minor side surfaces extending transversely to the major side surfaces with longitudinal axes of the filaments extending generally parallel to the major side surfaces of the layers, and metallurgically bonding the layers and increasing the density of the preform, said step of metallurgically bonding the layers and increasing the density of the preform including applying a deformation force against the preform in a direction generally perpendicular to minor side surfaces of the layers and parallel to the major side surfaces of the layers, limiting deformation of the layers in a direction perpendicular to major side surfaces of the layers under the influence of the deformation force by pressing the layers against a rigid body including preventing substantial buckling of the preform from application of the deformation force, and maintaining the filaments substantially free of axially extending forces during performance of the step of bonding the layers and increasing the density of the preform.

33. A method as set forth in claim 32 wherein said step of bonding the layers and increasing the density of the preform includes plastically deforming the layers under the influence of the deformation force by decreasing the distance between the minor side surfaces of the layers and increasing the distance between the major side surfaces of the layers.

34. A method as set forth in claim 32 wherein said step of forming a preform includes providing a metal carrier strip, placing a plurality of lengths of a filamentary reinforced composite on the carrier strip with the ends of the lengths of composite in abutting engagement, and winding the carrier strip and lengths of composite around an axis to form the preform.

35. A method as set forth in claim 34 wherein said step of bonding the layers and increasing the density of the preform includes bonding the carrier strip to the lengths of composite.

36. A method as set forth in claim 34 wherein said step of forming a preform includes forming a preform having a generally circular configuration.

* * * * *